(12) United States Patent
Ren et al.

(10) Patent No.: US 10,929,891 B2
(45) Date of Patent: Feb. 23, 2021

(54) CONTENT SPONSORSHIP BASED ON INTERNET PROTOCOL (IP) ADDRESSES

(71) Applicant: Verizon Patent and Licensing Inc., Arlington, VA (US)

(72) Inventors: Dahai Ren, Lincoln, MA (US); Feng Li, Lexington, MA (US); Susan Kelly, Maynard, MA (US); Ming Chen, Bedford, MA (US)

(73) Assignee: Verzon Patent and Licensing Inc., Basking Ridge, NJ (US)

( * ) Notice: Subject to any disclaimer, the term of this patent is extended or adjusted under 35 U.S.C. 154(b) by 169 days.

(21) Appl. No.: 15/716,143

(22) Filed: Sep. 26, 2017

(65) Prior Publication Data

US 2019/0095954 A1 Mar. 28, 2019

(51) Int. Cl.
*G06Q 30/02* (2012.01)
*H04L 9/32* (2006.01)
*H04L 29/12* (2006.01)

(52) U.S. Cl.
CPC ....... *G06Q 30/0269* (2013.01); *H04L 9/3215* (2013.01); *H04L 61/2015* (2013.01); *H04L 61/2007* (2013.01)

(58) Field of Classification Search
CPC .................. H04L 61/35; H04L 61/2015
See application file for complete search history.

(56) References Cited

U.S. PATENT DOCUMENTS

| | | | | |
|---|---|---|---|---|
| 7,848,312 | B2 * | 12/2010 | Zhang | H04L 12/1471 370/352 |
| 10,111,060 | B2 * | 10/2018 | Leung | H04L 12/1435 |
| 10,708,222 | B1 * | 7/2020 | Bean | H04L 61/2015 |
| 2005/0044243 | A1 * | 2/2005 | Narayanan | H04L 12/14 709/229 |
| 2008/0205399 | A1 * | 8/2008 | Delesalle | H04L 29/12349 370/392 |
| 2009/0055517 | A1 * | 2/2009 | Kao | H04L 61/2015 709/221 |

(Continued)

OTHER PUBLICATIONS

Tao Zhang, S. Madhani and M. Tauil, "Toll-free IP (TIP): architecture and implementation," IEEE Wireless Communications and Networking Conference, 2005, New Orleans, LA, 2005, pp. 2324-2330 vol. 4, doi: 10.1109/WCNC.2005.1424878 (Year: 2005).*

(Continued)

*Primary Examiner* — Michael Bekerman
*Assistant Examiner* — Scott Snider

(57) ABSTRACT

A device can receive, from a user device, a request associated with a data service that includes one or more service identifiers. The device can determine whether the data service is toll-free by providing, to a server, a validation request that includes the one or more service identifiers. The device can receive a response from the server that indicates that the user device is eligible to use the data service toll-free. The device can obtain an internet protocol (IP) address that is reserved for the data service by using a service identifier to search a data structure. The device can provide the IP address to the user device to allow the user device to use the IP address for a data session. Traffic flow for the data session can be received by another server that uses the IP address to update an account of an entity sponsoring the data service.

20 Claims, 7 Drawing Sheets

(56) References Cited

U.S. PATENT DOCUMENTS

| | | | | |
|---|---|---|---|---|
| 2009/0122798 A1* | 5/2009 | Iwai | ............... | H04L 29/12783 |
| | | | | 370/392 |
| 2009/0190590 A1* | 7/2009 | Agetsuma | ............... | H04L 67/10 |
| | | | | 370/392 |
| 2009/0290540 A1* | 11/2009 | Cherian | ............... | H04L 47/10 |
| | | | | 370/328 |
| 2014/0052860 A1* | 2/2014 | Duggal | ............... | H04L 41/00 |
| | | | | 709/225 |
| 2014/0067527 A1* | 3/2014 | Schussel | ............ | G06Q 30/0251 |
| | | | | 705/14.49 |
| 2015/0312255 A1* | 10/2015 | Libonate | ............ | H04L 63/0876 |
| | | | | 713/168 |

OTHER PUBLICATIONS

"IP Aliasing" Wikipedia article archived on Dec. 2, 2016, https://en.wikipedia.org/w/index.php?title=IP_aliasing&oldid=752658033 (Year: 2016).*

Blott, S.M., Martin, C.E., Breitbart, Y.J., Brustoloni, J.C., Gramaglia, T.R., Korth, H.F., Kristol, D.M., Liao, R.H., Scanlon, E.L. and Silberschatz, A. (1999), User-level billing and accounting in IP networks. Bell Labs Tech. J., 4: 237-251. doi:10.1002/bltj.2201 (Year : 1999).*

M. Koutsopoulou, A. Kaloxylos, A. Alonistioti, L. Merakos and K. Kawamura, "Charging, accounting and billing management schemes in mobile telecommunication networks and the internet," in IEEE Communications Surveys & Tutorials, vol. 6, No. 1, pp. 50-58, First Quarter 2004 (Year: 2004).*

* cited by examiner

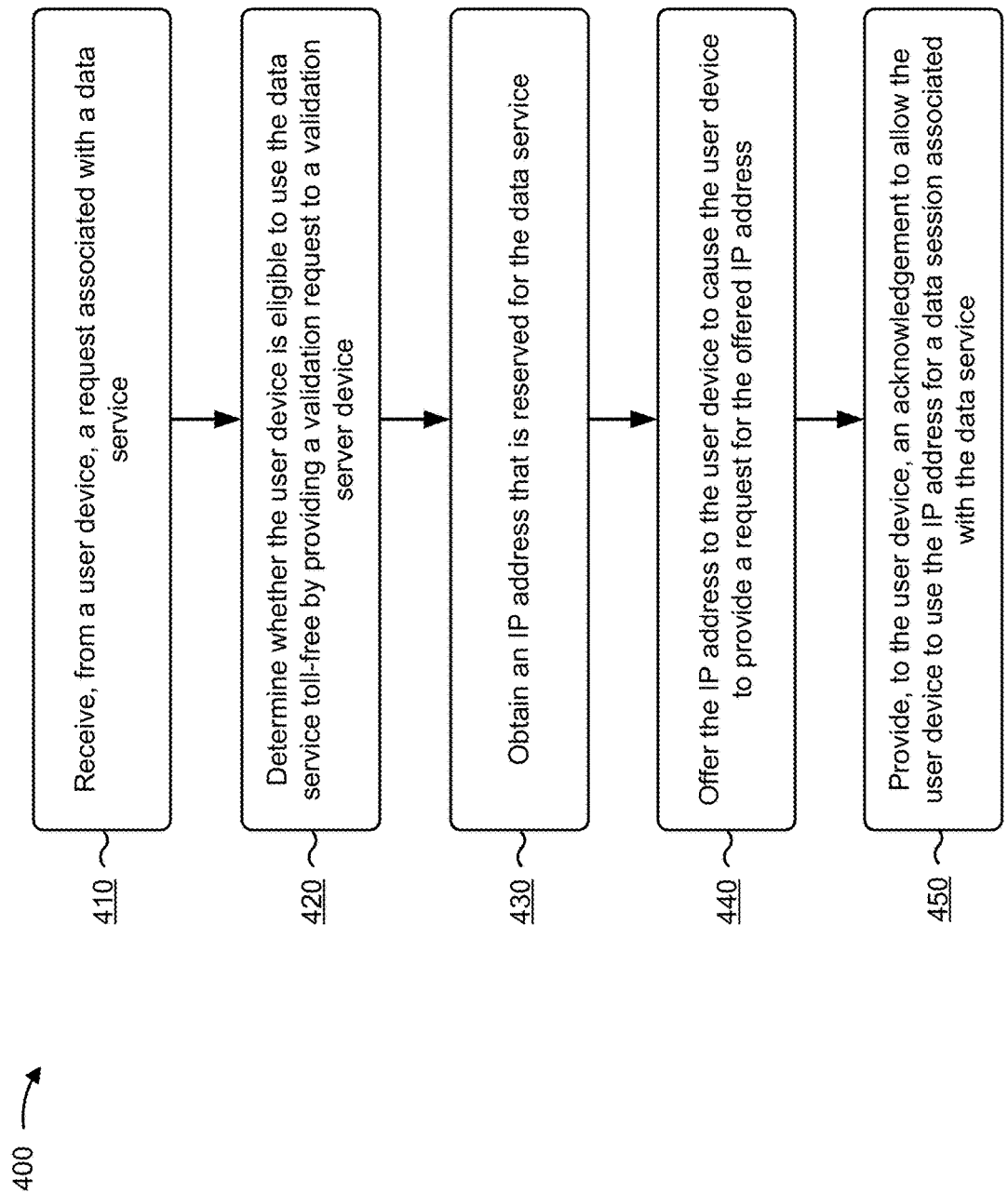

CONTENT SPONSORSHIP BASED ON INTERNET PROTOCOL (IP) ADDRESSES

BACKGROUND

A toll-free data service can refer to a network service where a network operator updates an account of a campaign owner that sponsors the toll-free data service, rather than updating an account of an end user that uses the toll-free data service.

BRIEF DESCRIPTION OF THE DRAWINGS

FIG. 4 is a flow chart of an example process for using IP addresses to sponsor content associated with a data service.

DETAILED DESCRIPTION OF PREFERRED EMBODIMENTS

The following detailed description of example implementations refers to the accompanying drawings. The same reference numbers in different drawings can identify the same or similar elements.

A user can interact with a user device to access a toll-free data service. In this case, a network operator can update an account of a campaign owner that sponsors the toll-free data service, rather than an account of the user accessing the toll-free data service.

However, to monitor toll-free traffic, a client-side proxy server and a server-side proxy server need to receive the toll-free traffic between the user device and a content provider device. For example, a packet might travel from the user device, to a client-side proxy server, to one or more network devices (e.g., base stations, routing devices, validation servers, account management devices, etc.), to a server-side proxy server, and to the content provider device. In this case, the complexity of the network architecture can cause traffic flow to experience delays and/or poor performance.

Some implementations described herein provide an IP allocation device to assign a user device an IP address that is associated with a toll-free data service, thereby allowing an account management device to analyze the IP address and update an account of a campaign owner that sponsors the toll-free data service. In this way, the IP allocation device orchestrates account management of the toll-free data service without a need for proxy servers.

Additionally, the IP allocation device conserves network resources by reducing a number of physical devices needed to provide the toll-free data service. Furthermore, providing toll-free data without proxy servers conserves processing resources and/or network resources that might otherwise be used to retransmit packets dropped by proxy servers and/or perform error correction techniques. By conserving processing resources and/or network resources, the IP allocation device improves overall system performance due to efficient and effective allocation of resources.

FIGS. 1A-1D are diagrams of an overview of an example implementation 100 described herein. As shown in FIGS. 1A-1D, example implementation 100 includes an IP allocation device that orchestrates account management associated with a toll-free data service, without a need for proxy servers.

Figure 1A:
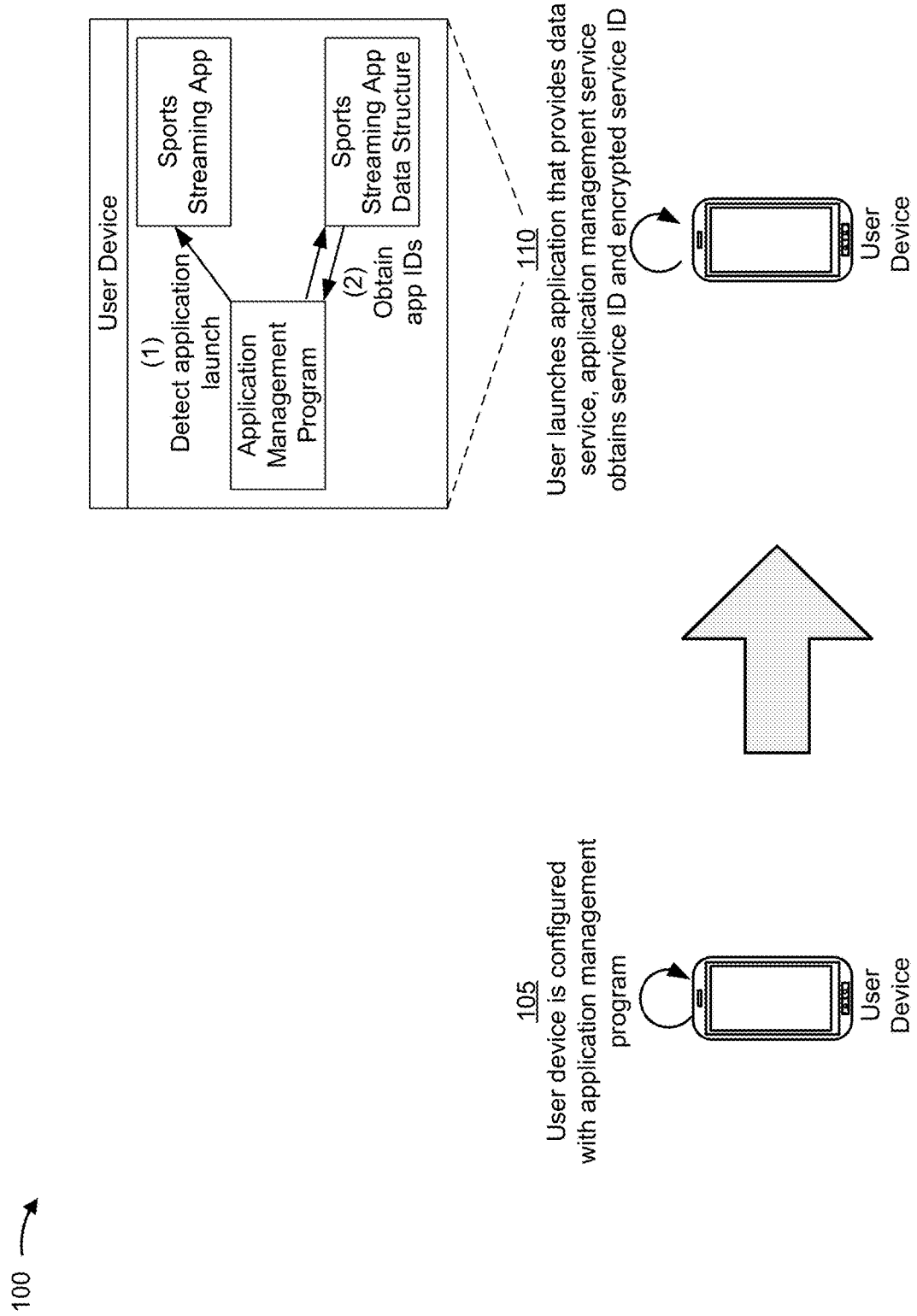
FIGS. 1A-1D are diagrams of an overview of an example implementation described herein.

As shown in FIG. 1A, and by reference number 105, a user device can be configured with an application management program (e.g., a daemon). For example, the user device can be configured with an application management program that manages IP address allocation associated with toll-free data services. In this case, the application management program can be configured during a device manufacturing process. Additionally, if an interface of the application management program is exposed to a user, the user can input one or more data services that the user would like to access toll-free. If an interface of the application management program is not exposed to the user, the user device can activate a plugin to obtain service identifiers when toll-free data services are launched.

Alternatively, the user device can obtain (e.g., download) the application management program. For example, a user can interact with a user interface of the user device to open a webpage that supports registration for toll-free data services. In this case, the webpage can allow a first-time user to register by creating a user account. To create a user account, the user can input a mobile directory number (MDN), user profile information, and/or the like. Additionally, the user device can download an application management program (e.g., a daemon) that is hosted locally on the user device to help manage IP address allocation associated with the toll-free data service.

As shown by reference number 110, the user can interact with the user device to launch an application that provides a data service, which can cause the application management program to obtain one or more service identifiers associated with the data service. For example, the application management program can monitor the toll-free data service (e.g., a sports streaming application can provide a data service that streams media content), and can detect that that the application that provides the toll-free data service has launched. In this case, the application management program can obtain a service identifier and an encrypted service identifier from a data structure (e.g., a flat file, a database, etc.) associated with the sports streaming application. The service identifier and the encrypted service identifier can be used to obtain an IP address for the data service, to validate whether the user device is eligible to use the data service toll-free, and/or the like, as described further herein.

Alternatively, rather than having the application management program monitor the toll-free data service, the application management program can automatically receive the one or more service identifiers from the data service. For example, a plugin can be installed onto the user device (e.g., onto the application that provides the data service) to automatically provide the one or more service identifiers to the application management program when the application is launched.

In this way, the user device is able to register for and begin accessing a toll-free data service.

Figure 1B:
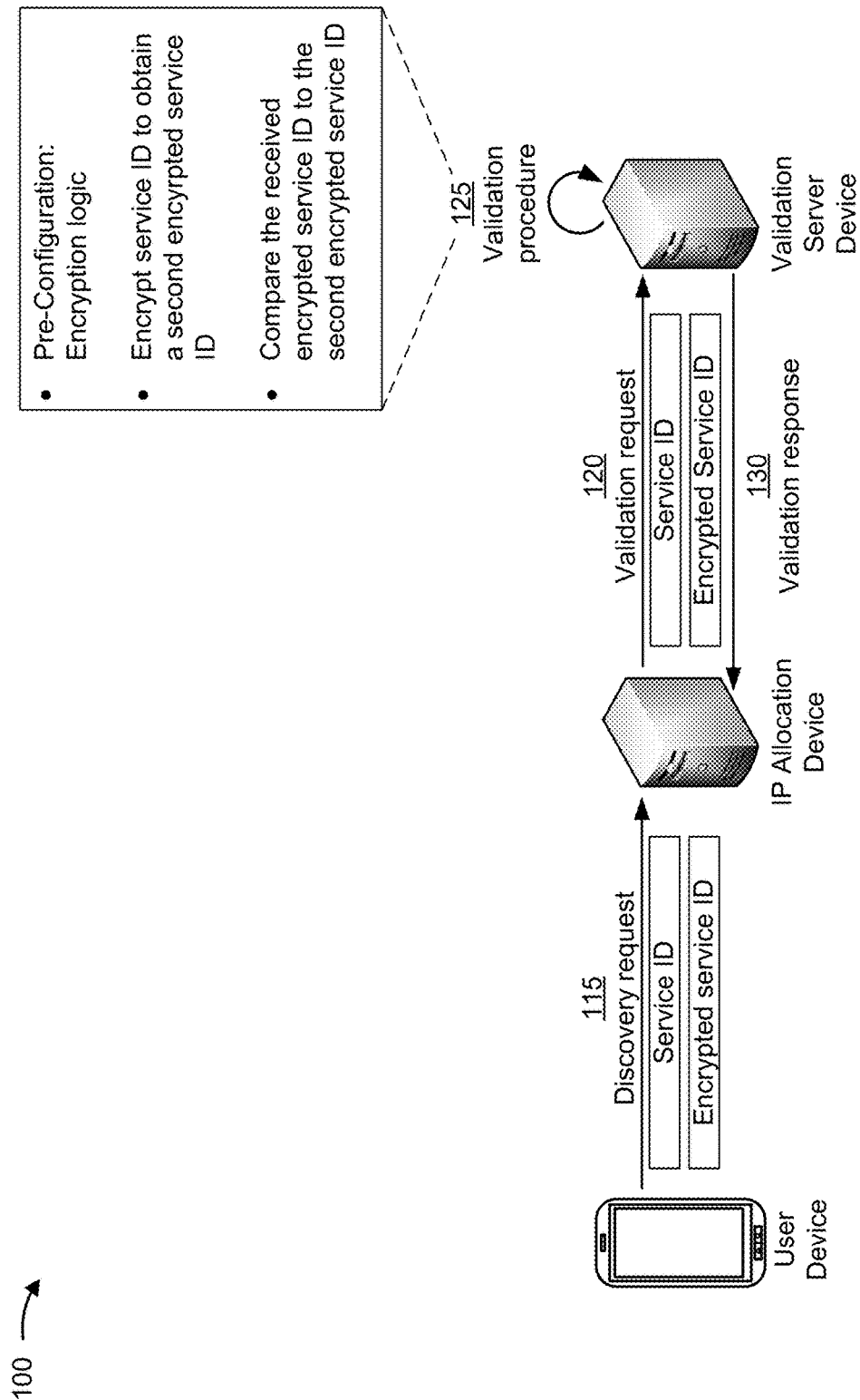

As shown in FIG. 1B, and by reference number 115, the user device can provide a discovery request (e.g., a DHCP discovery request) to an IP allocation device. The discovery request can include the service identifier and the encrypted service identifier. As shown by reference number 120, the IP allocation device can provide, to a validation server device, a validation request to determine whether the user device is eligible to use the data service toll-free. The validation request can include the service identifier and the encrypted service identifier.

As shown by reference number 125, the validation server device can execute a validation procedure. For example, the validation server device can execute a validation procedure that is previously agreed upon by a content provider and a network operator to ensure that the content provider is not sponsoring data use of unregistered users.

In this case, the validation server device can execute the validation procedure by using encryption logic to encrypt the service identifier to create a second encrypted service identifier. Additionally, the validation server device can compare the encrypted service identifier and the second encrypted service identifier. If the encrypted service identifier and the second encrypted service identifier match, the validation procedure succeeds, indicating that the user device is eligible to use the data service toll-free. If the encrypted service identifier and the second encrypted service identifier do not match, the validation procedure fails, indicating that the user device is not eligible to use the data service toll-free.

As shown by reference number 130, the validation server device can provide a validation response to the IP allocation device. The validation response can include a validation result indicating whether the validation succeeded or failed.

In this way, the IP allocation device is able to use information included in the discovery request to determine whether the user device is eligible to use the data service toll-free.

Figure 1C:
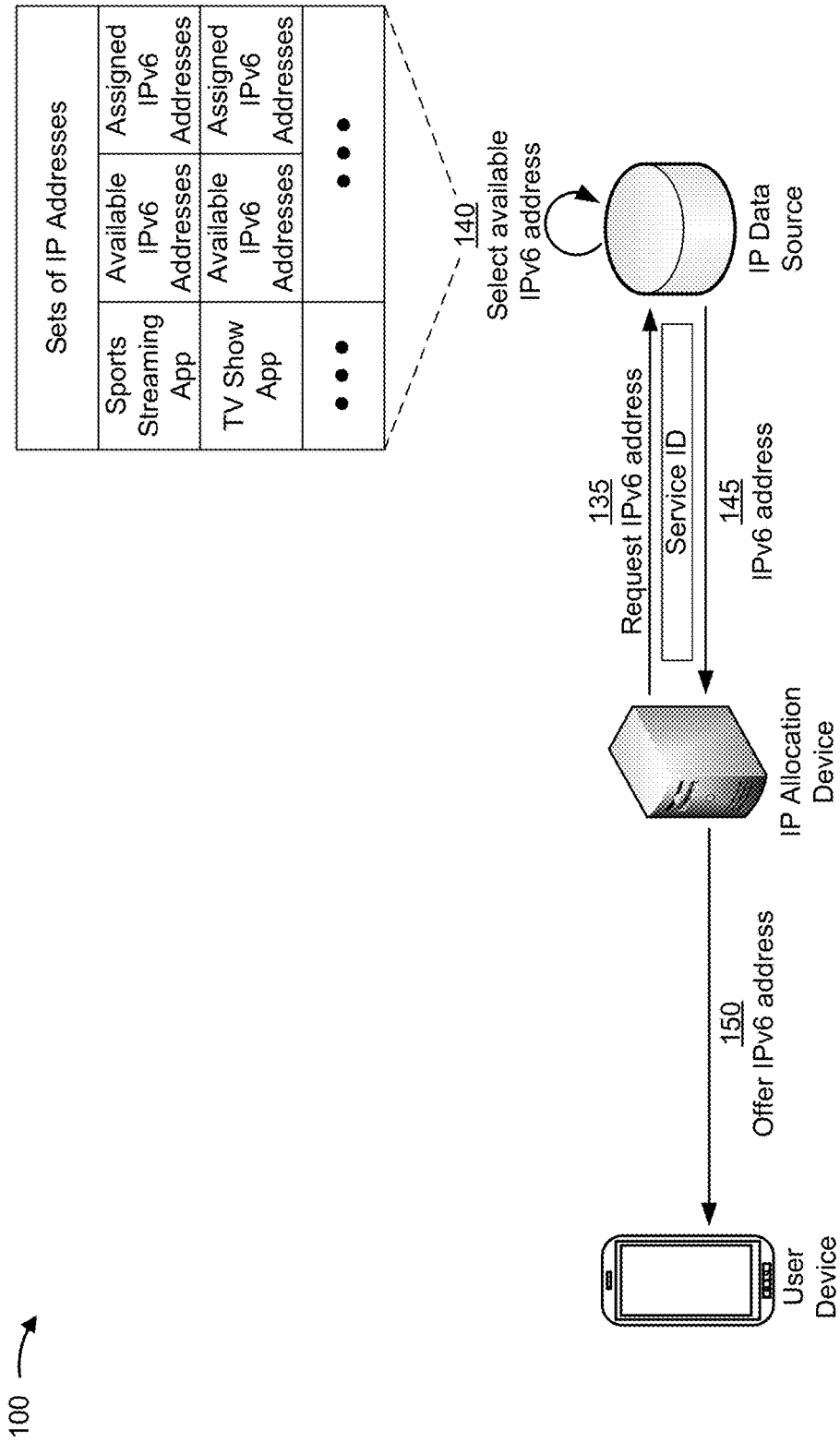

As shown in FIG. 1C, and by reference number 135, the IP allocation device can provide a request for an IP version 6 (IPv6) address (or another type of network identifier) to an IP data source. The request can include the service identifier. As shown by reference number 140, the IP data source can select an available IPv6 address. For example, the IP data source can store sets of IPv6 addresses where each set is reserved for a particular toll-free data service. As shown, a particular set of IPv6 addresses can be reserved for the sports streaming application. In this case, the IP data source can use the service identifier to identify the particular set of IPv6 addresses, and can select an available IPv6 address from the set.

As shown by reference number 145, the IP data source can provide the IPv6 address to the IP allocation device. As by reference number 150, the IP allocation device can provide an offer (e.g., a DHCP offer) to the user device to use the selected IPv6 address.

In this way, the IP allocation device is able to use the service identifier for the toll-free data service to obtain an IPv6 address to offer to the user device.

Figure 1D:
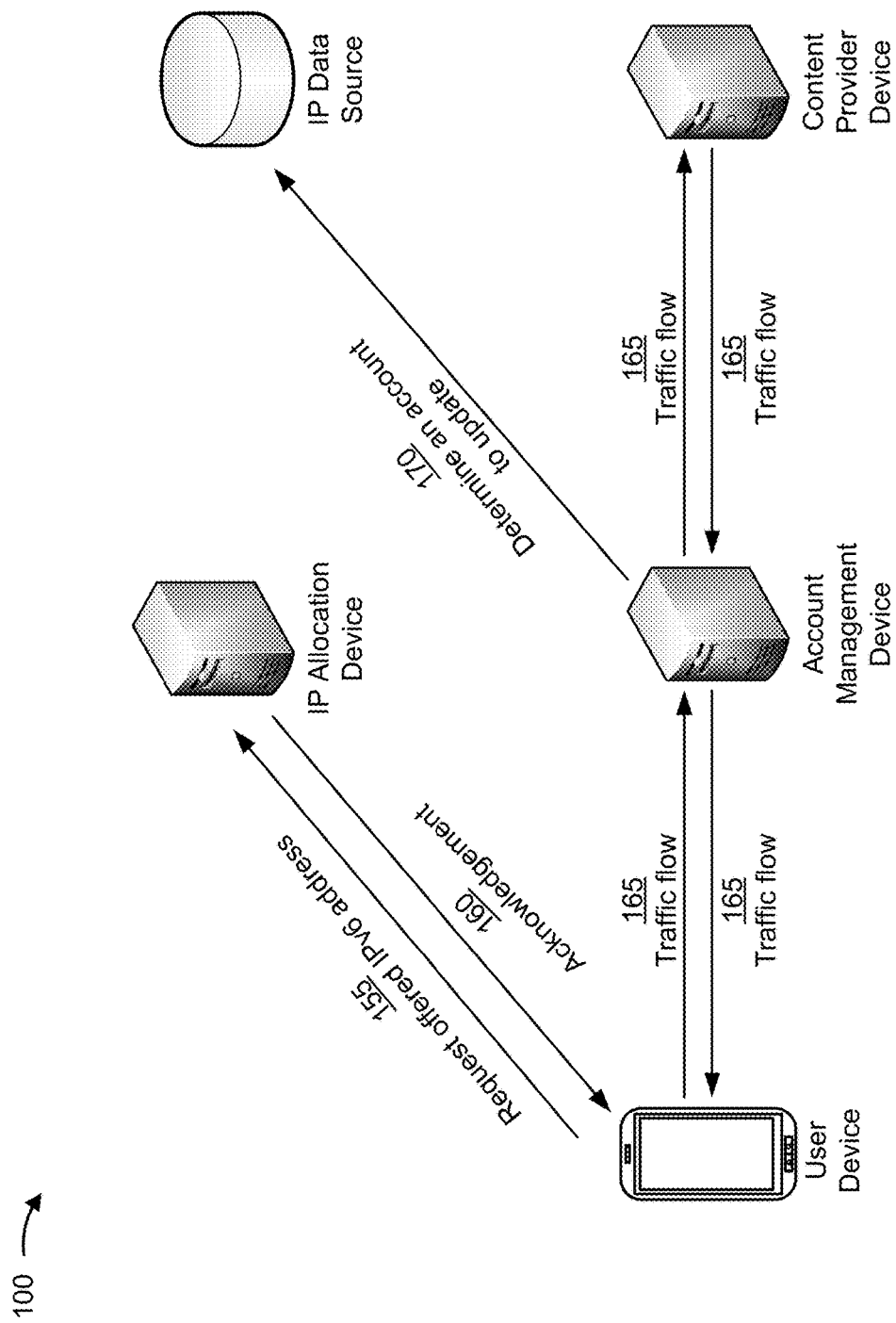

As shown in FIG. 1D, and by reference number 155, the user device can provide, to the IP allocation device, a request (e.g., a DHCP request) for the offered IPv6 address. As shown by reference number 160, the IP allocation device can provide an acknowledgment (e.g., a DHCP acknowledgement) to the user device indicating that that the offered IPv6 address is to be used for a data session associated with the data service.

As shown by reference number 165, traffic flow for the data service can occur between the user device and a content provider device. Additionally, an account management device can serve as an intermediary and can receive packets associated with the traffic flow.

As shown by reference number 170, the account management device can analyze the packets to identify the IPv6 address, and can use the identified IPv6 address to search (e.g., query) the IP data source. If the IPv6 address is associated with a particular set of IPv6 addresses that are reserved for toll-free data, then the account management device can update an account of a content provider. If the IPv6 address is not associated with a particular set of IPv6 addresses that are reserved for toll-free data, then the account management device can update an account of a user associated with the user device.

In this way, by assigning an IPv6 address that is associated with a particular toll-free data service, the IP allocation device orchestrates account management of the toll-free data service without a need for proxy servers.

As indicated above, FIGS. 1A-1D are provided merely as an example. Other examples are possible and can differ from what was described with regard to FIGS. 1A-1D. For example, there can be additional devices, fewer devices, different devices, or differently arranged devices than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of environment 100 can perform one or more functions described as being performed by another set of devices of environment 100. As an example of a different implementation, instead of using DHCP, example implementation 100 could be carried out using a bootstrap protocol (BOOTP), or a similar type of protocol.

Figure 2:
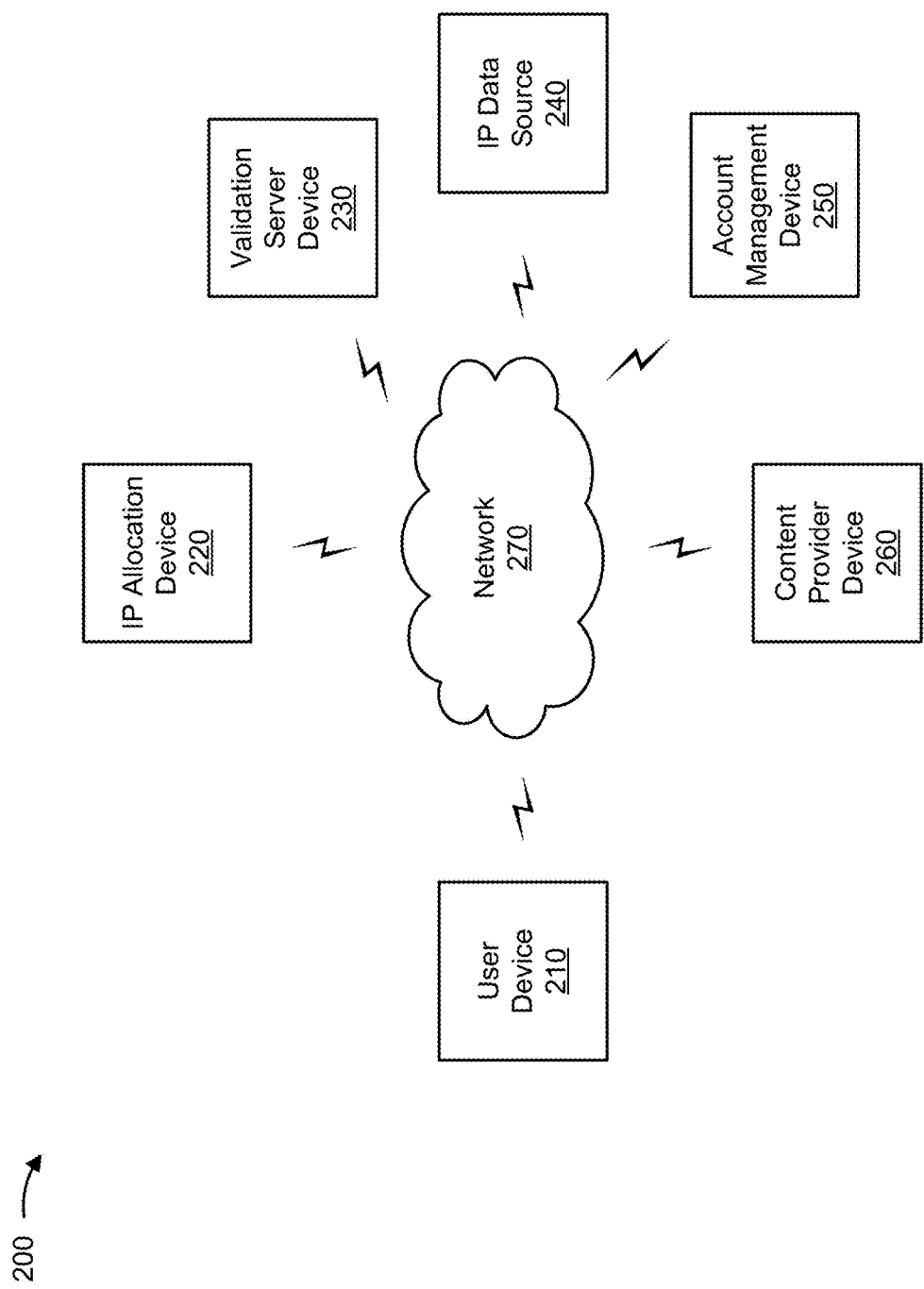
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, an IP allocation device 220, a validation server device 230, an IP data source 240, an account management device 250, a content provider device 260, and/or a network 270. Devices of environment 200 can interconnect via wired connections, wireless connections, optical connections, or a combination of connections.

User device 210 includes one or more devices capable of receiving, generating, storing, processing, and/or providing information associated with a data service. For example, user device 210 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 210 can provide a request to IP allocation device 220. In some implementations, user device 210 can receive an offer for an IP address from IP allocation device 220. In some implementations, user device 210 can provide a request for an offered IP address to IP allocation device 220. In some implementations, user device 210 can receive an acknowledgement from IP allocation device 220 indicating that the IP address has been assigned.

IP allocation device 220 includes one or more devices capable of receiving, generating, storing, processing, and/or providing information associated with a data service. For example, IP allocation device 220 can include a computing device, such as a server device (e.g., a DHCP server, a host server, a web server, an application server, etc.), a data center device, or a similar device. In some implementations, IP allocation device 220 can provide a validation request to validation server device 230. In some implementations, IP allocation device 220 can receive a validation response from validation server device 230.

Validation server device 230 includes one or more devices capable of receiving, generating, storing, processing, and/or providing information associated with a data service. For example, validation server device 230 can include a server device or a group of server devices.

IP data source 240 includes one or more devices capable of receiving, generating, storing, processing, and/or providing information associated with IP addresses. For example, IP data source 240 can include a server device or a group of server devices. In some implementations, IP data source 240 can receive a request for an IP address from IP allocation device 220. In some implementations, IP data source 240 can provide an IP address to IP allocation device 220. In some implementations, IP data source 240 can receive a request (e.g., a query) from account management device 250.

Account management device 250 includes one or more devices capable of receiving, generating, storing, processing, and/or providing information associated with a data service. For example, account management device 250 can include a server device or a group of server devices.

Content provider device 260 includes one or more devices capable of receiving content from and/or providing content to a device (e.g., user device 210). For example, content provider device 260 can include a content server, a host server, a web server, an application server, or the like. In some implementations, content provider device 260 can be associated with a content provider that sponsors a toll-free data service, where the content provider is charged for data usage associated with the toll-free data service rather than an end user associated with user device 210.

Network 270 includes one or more wired and/or wireless networks. For example, network 270 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
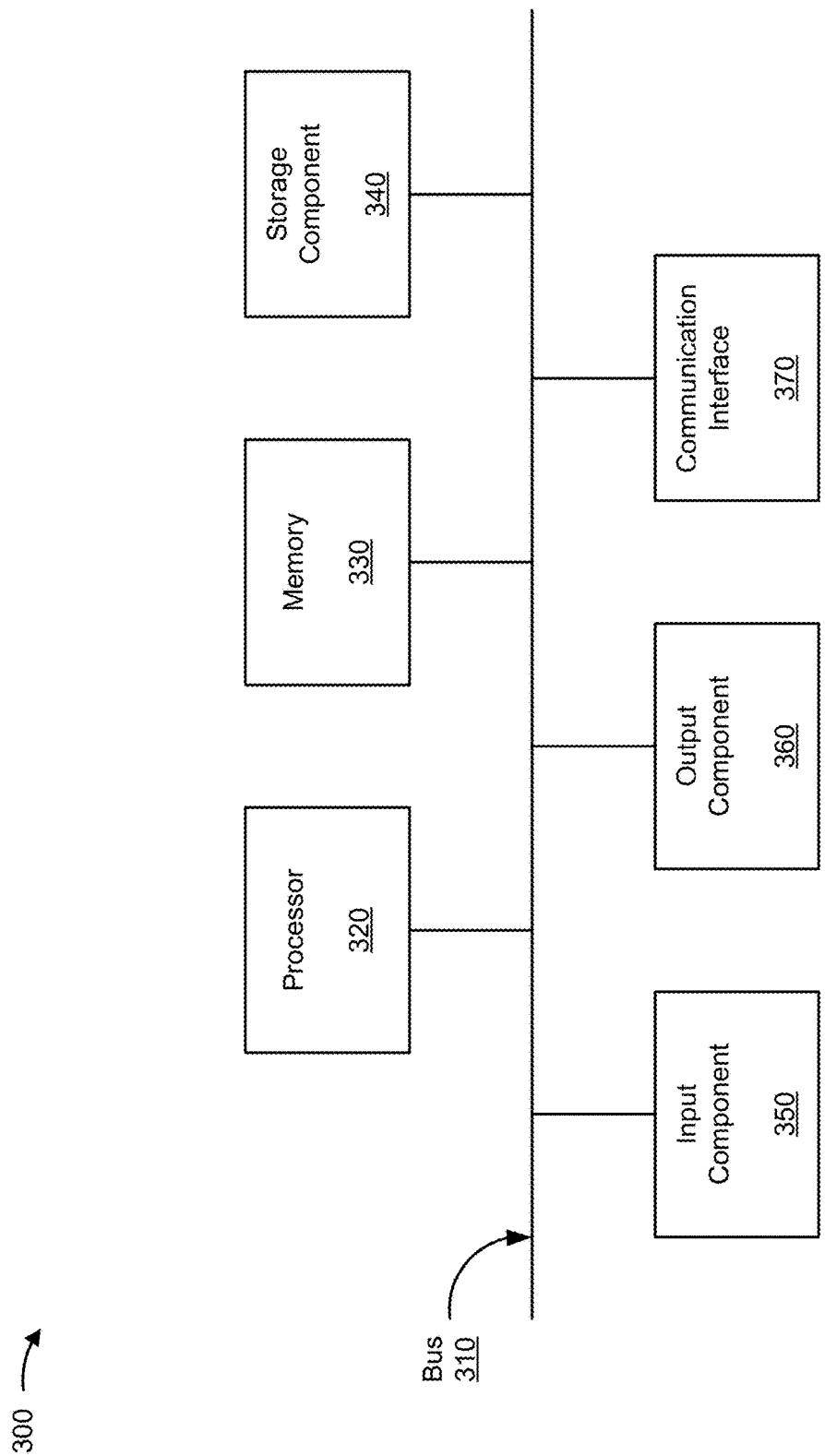
FIG. 3 is a diagram of example components of one or more devices of FIG. 2.

FIG. 3 is a diagram of example components of a device 300. Device 300 can correspond user device 210, IP allocation device 220, validation server device 230, IP data source 240, account management device 250, and/or content provider device 260. In some implementations, user device 210, IP allocation device 220, validation server device 230, IP data source 240, account management device 250, and/or content provider device 260 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for using IP addresses to sponsor content associated with a data service. In some implementations, one or more process blocks of FIG. 4 can be performed by IP allocation device 220. In some implementations, one or more process blocks of FIG. 4 can be performed by another device or a group of devices separate from or including IP allocation device 220, such as user device 210, validation server device 230, IP data source 240, account management device 250, and/or content provider device 260.

As shown in FIG. 4, process 400 can include receiving, from a user device, a request associated with a data service (block 410). For example, internet protocol (IP) allocation device 220 can receive, from user device 210, a discovery request (e.g., a dynamic host configuration protocol (DHCP) discovery request) associated with a toll-free data service. The discovery request can be a request to be assigned an IP address to use for a data session associated with the data service. The request can include one or more service identifiers (e.g., a service identifier, an encrypted service identifier, etc.) which can be used to obtain the IP address and/or determine whether user device 210 is eligible to use the data service toll-free, as described further herein.

In some implementations, a content provider can register a data service as toll-free. For example, the content provider can register for the toll-free data service by completing a registration process. During the registration process, the content provider and a network operator can agree to a validation procedure to ensure that only authorized users are able to access the data service. Additionally, different content providers can agree to different validation procedures depending on an amount of security needed for a particular data service.

In some implementations, user device 210 can register for a toll-free data service. For example, a user can interact with a web interface of user device 210 to access a uniform resource locator (URL) of a web location that supports registration of toll-free data services. In this case, the user can register by creating a user account, and can create the user account by providing a mobile directory number (MDN), user profile information, and/or the like. Additionally, if the user is registering for a toll-free data service for the first time, user device 210 can obtain (e.g., via a download) an application management program (e.g., a daemon) that is hosted locally on user device 210 to help manage IP address allocation associated with toll-free data services.

As another example, the user can register for the toll-free data service using a registration application. In this case, user device 210 can install a registration application, and the user can interact with user device 210 to open the registration application and create an account, in a manner similar to that described above.

As another example, the user can register for the toll-free data service via a notification within an application that provides the data service. In this case, a plugin installed on the application can cause a pop-up menu to be displayed via user device 210, which can allow the user to register for the data service. In this example, the user can interact with the pop-up menu options to create an account in a manner similar to that described above.

In some implementations, one or more processors of user device 210 can cause the application management program (e.g., the daemon) to interact with the application that provides data service to obtain the service identifier and the encrypted service identifier. For example, a user can interact with user device 210 to launch the application that provides the toll-free data service. In this case, as the application is launched, the one or more processors of user device 210 can cause the application management program to use an internal application programming interface (API) to obtain the service identifier and encrypted service identifier from the application that provides data service.

In some implementations, one or more processors of user device 210 can cause the application that provides the data service to automatically provide the one or more service identifiers to the application management program. For example, the application that provides the data service can utilize a plugin that automatically provides the one or more service identifiers to the application management program when the application is launched. In this way, the application management program can obtain the one or more service identifiers which can be provided to IP allocation device 220 to determine whether user device 210 is eligible to use the data service toll-free, as described further herein.

In some implementations, user device 210 can provide a DHCP discovery request to IP allocation device 220. For example, user device 210 can provide a DHCP discovery request to IP allocation device 220 that includes the one or more service identifiers.

In this way, IP allocation device 220 is able to receive a request that includes one or more service identifiers that can be used to validate whether user device 210 is eligible to use the data service toll-free.

As further shown in FIG. 4, process 400 can include determining whether the user device is eligible to use the data service toll-free by providing a validation request to a validation server device (block 420). For example, IP allocation device 220 can determine whether user device 210 is eligible to use the data service toll-free by providing a validation request to validation server device 230. The validation request can include the one or more service identifiers (e.g., the service identifier, the encrypted service identifier, etc.).

In some implementations, validation server device 230 can use a validation procedure to determine whether user device 210 is eligible to use the data service. For example, validation server device 230 can execute a validation procedure that uses encryption logic to encrypt the service identifier to create a second encrypted service identifier. In this case, validation server device 230 can compare the encrypted service identifier and the second encrypted service identifier. If the encrypted service identifier matches the second encrypted service identifier, validation server device 230 can determine that the validation succeeds, indicating that user device 210 is eligible to use the data service toll-free. If the encrypted service identifier does not match the second encrypted service identifier, validation server device 230 can determine that the validation has failed, indicating that user device 210 is not eligible to use the data service toll-free.

As another example, validation server device 230 can use decryption to determine whether user device 210 is eligible to use the data service. For example, assume the validation request includes the service identifier and the encrypted service identifier. In this case, validation server device 230 can execute a validation procedure that uses decryption logic to decrypt the encrypted service identifier. Additionally, validation server device 230 can compare the decrypted service identifier to the service identifier. If the decrypted service identifier matches the service identifier, the validation can succeed. If the decrypted service identifier does not match the service identifier, the validation can fail.

In some implementations, validation server device 230 can provide a validation response to IP allocation device 220. For example, validation server device 230 can provide a response indicating whether the validation succeeded or failed.

Additionally, or alternatively, IP allocation device 220 can determine whether user device 210 is eligible to use the data service toll-free based on whether one or more conditions are satisfied. For example, IP allocation device 220 can be configured with one or more conditions, and can determine user device 210 is eligible to use the data service toll-free based on whether the one or more conditions are satisfied. The one or more conditions can include a location-based condition (e.g., user device 210 can be eligible to use the data service toll-free only if in a particular location), an advertising-based condition (e.g., user device 210 can be eligible to use the data service toll-free only after consenting to view one or more advertisements), a condition associated with user profile information (e.g., user device 210 can be eligible to use the data service toll-free only if particular characteristics are found in a user profile), and/or the like.

As an example, IP allocation device 220 can determine whether user device 210 is eligible to use the data service toll-free based on whether a location-based condition is satisfied. For example, IP allocation device 220 can determine a geographic location of user device 210, and can compare the geographic location of user device 210 to a geographic area associated with a toll-free data condition. In this case, IP allocation device 220 can determine that user device 210 is eligible to use the data service toll-free based on comparing the geographic location of user device 210 to the geographic are associated with the toll-free data condition.

As another example, IP allocation device 220 can determine whether user device 210 is eligible to use the data service toll-free based on whether an advertising-based condition is satisfied. For example, IP allocation device 220 can determine whether user device 210 provided consent to receive advertisements while using the data service (e.g., consent can be provided while registering for the toll-free data service). In this case, IP allocation device 220 can determine whether user device 210 is eligible to use the data service toll-free based on determining whether user device 210 provided consent to receive advertisements.

As another example, IP allocation device 220 can determine whether user device 210 is eligible to use the data service toll-free based on whether a condition associated with user profile information is satisfied. For example, IP allocation device 220 can obtain user profile information for a user associated with user device 210 (e.g., from a home subscriber server (HSS)). The condition associated with the user profile information can be a condition requiring that a user be registered for a particular data plan, be of a particular socioeconomic group, and/or the like. In this case, IP allocation device 220 can compare the user profile information to the condition associated with the user profile information, and can determine that user device 210 is eligible to use the data service toll-free based on comparing the user profile information to the condition.

In this way, IP allocation device 220 is able to determine whether user device 210 is eligible to use the data service toll-free.

As further shown in FIG. 4, process 400 can include obtaining an IP address that is reserved for the data service (block 430). For example, IP allocation device 220 can obtain, from a data structure associated with IP data source 240, an IP address that is reserved for the data service.

In some implementations, IP data source 240 can store sets of IP addresses using a data structure. For example, IP data source 240 can store each set of IP addresses in a manner that associates each set of IP addresses with a particular service identifier. Additionally, the data structure can be a flat file, a database (e.g., a relational database), a tree, a graph, a hash table, a linked-list, or the like.

In some implementations, IP allocation device 220 can provide, to IP data source 240, a request for an IP address. For example, IP allocation device 220 can provide a request that includes the service identifier. In this case, IP data source 240 can use the service identifier to search the data structure for a matching service identifier. Additionally, IP data source 240 can select an available IP address from a set of IP addresses associated with the matching service identifier. Furthermore, IP data source 240 can provide the IP address to IP allocation device 220. Alternatively, IP allocation device 220 can host the data structure, eliminating the need to query an external device.

In some implementations, IP allocation device 220 can assign an IP address that is not reserved for the toll-free data service. For example, assume the validation procedure failed, indicating that user device 210 is not eligible to use the toll-free data service. In this case, IP allocation device 220 can assign an IP address that is not associated with toll-free data.

In some implementations, IP allocation device 220 can assign an IP address based on whether the one or more condition are satisfied. For example, as described elsewhere herein, IP allocation device 220 can be configured with one or more conditions, and can determine whether user device 210 is eligible to use the data service toll-free based on the one or more conditions. In this case, IP allocation device 220 can assign an IP address based on whether the one or more conditions are satisfied.

In this way, IP allocation device 220 is able to obtain and assign an IP address that can be used for a data session associated with the data service.

As further shown in FIG. 4, process 400 can include offering the IP address to the user device to cause the user device to provide a request for the offered IP address (block 440). For example, IP allocation device 220 can provide an offer (e.g., a DHCP offer) to user device 210 to use the IP address for a data session associated with the data service. In this case, user device 210 can provide, to IP allocation device 220, a request (e.g., a DHCP request) to use the offered IP address.

In some implementations, IP allocation device 220 can provide, to user device 210, a DHCP offer that includes the IP address. For example, if the validation succeeded, IP allocation device 220 can provide a DHCP offer that includes the IP address that is reserved for toll-free data use. If the validation failed, IP allocation device 220 can provide a DHCP offer that includes an IP address that is not reserved for toll-free data use.

In some implementations, IP allocation device 220 can receive, from user device 210, a DHCP request for the offered IP address. For example, user device 210 can select the offered IP address, and can provide a DHCP request to IP allocation device 220 to notify IP allocation device 220 of the selection.

In this way, IP allocation device 220 can offer user device 210 an IP address that can be used for a data session associated with the data service.

As further shown in FIG. 4, process 400 can include providing, to the user device, an acknowledgement to allow the user device to use the IP address for a data session associated with the data service (block 450). For example, IP allocation device 220 can provide an acknowledgement (e.g., a DHCP acknowledgement) to user device 210 to allow user device 210 to use the IP address for a data session associated with the data service.

In some implementations, user device 210 can receive traffic flow associated with the data service from one or more devices. For example, content provider device 260 can provide traffic flow (e.g., packets) associated with the data service to account management device 250, one or more network devices (e.g., base stations, routing gateways, etc.), and/or to user device 210.

In some implementations, traffic flow for the data service can be received by account management device 250. For example, traffic flow for the data service can be received by account management device 250, and account management device 250 can analyze the traffic flow to identify the IP address. As an example, the traffic flow can include packets, and account management device 250 can analyze headers of the packets to identify the IP address.

Additionally, account management device 250 can use the IP address to update an account. For example, account management device 250 can use the IP address to determine whether to update an account associated with a content provider or an account associated with a user accessing user device 210. In this case, account management device 250 can query IP data source 240 to compare the IP address to the set of IP addresses reserved for using the data service toll-free. If the IP address matches an IP address included in the set of IP addresses, then account management device 250 can update an account of the content provider (or an account of a content sponsor if the content sponsor is a different entity than the content provider). If the IP address does not match an IP address included in the set of IP addresses, then account management device 250 updates an account of the user associated with user device 210.

In some implementations, user device 210 can end the data session (e.g., by closing the application). In this case, an indication of the data session ending can be received by IP allocation device 220 or account management device 250, and IP allocation device 220 or account management device 250 can provide the indication to IP data source 240. This can allow IP data source 240 to update the data structure such that the IP address can be made available for assignment to subsequent devices that qualify to use the data service toll-free.

In this way, IP allocation device 220 is able to orchestrate establishment of a data session that uses an IP address reserved for toll-free data use, thereby allowing accounts to be updated (e.g., charged) without the need for a client-side proxy server and without the need for a server-side proxy server.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, IP allocation device 220 orchestrates account management of the toll-free data service without a need for proxy servers. Additionally, IP allocation device 220 conserves network resources by reducing a number of physical devices needed to provide the toll-free data service. Furthermore, providing toll-free data without proxy servers conserves processing resources and/or network resources that might otherwise be used to retransmit packets dropped by proxy servers and/or perform error correction techniques. By conserving processing resources and/or network resources, IP allocation device 220 improves overall system performance due to efficient and effective allocation of resources.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a user device, a request associated with an application that provides a data service,
where the request includes one or more service identifiers, and
where an application management program hosted on the user device is configured to use an application programming interface to interact with the application to obtain the one or more service identifiers;
determine whether the user device is eligible to use the data service toll-free by providing, to a server, a validation request that includes the one or more service identifiers;
receive a response from the server that is based on a validation procedure that indicates that the user device is eligible to use the data service toll-free;
obtain an internet protocol (IP) address that is reserved for toll-free usage by the application, by using a service identifier of the one or more service identifiers to search a data structure associated with the data service; and
provide the IP address to the user device,
the user device to use the IP address for a data session of the application,
where traffic flow associated with the user device is received by another server that uses the IP address to charge, for the data session, an account associated with a sponsor of toll-free usage of the data service,
where using the IP address to charge for the data service comprises verifying that the IP address matches an IP address included in a set of IP addresses reserved for toll-free usage of the data service,
where the user device uses one or more other IP addresses, different from the IP address, for data usage not associated with the application, and
where, when the data session ends, the IP address is made available for assignment to another user device that is eligible to use the data service toll-free.

2. The device of claim 1, where the user device uses the data service toll-free without the use of a proxy server.

3. The device of claim 1, where the one or more processors of the user device cause the application management program to provide the request associated with the data service to the device.

4. The device of claim 1, where the one or more processors, when determining whether the user device is eligible to use the data service toll-free, are to:
provide the validation request to the server to cause the server to use the one or more service identifiers to execute a validation procedure,
where the one or more service identifiers include a service identifier and an encrypted service identifier,
where the validation procedure includes:
using encryption logic to encrypt the service identifier to create a second encrypted service identifier, and
comparing the encrypted service identifier to the second encrypted service identifier, and
where the user device is determined to be eligible to use the data service toll-free based on the encrypted service identifier and the second encrypted service identifier matching.

5. The device of claim 1, where the one or more processors, when obtaining the IP address that is reserved for the data service, are to:
provide a request for the IP address to a data source,
the request causing the data source to select the IP address from the data structure,
the IP address being one of a set of IP addresses reserved for the data service, and
receive the IP address from the data source.

6. The device of claim 1, where the request associated with the data service is a dynamic host configuration protocol (DHCP) request; and
where the one or more processors, when providing the IP address to the user device, are to:
provide the IP address to the user device as part of a DHCP offer;
where the one or more processors are further to:
receive, from the user device, a DHCP request for the IP address; and
provide a DHCP acknowledgement to the user device indicating that the IP address has been assigned.

7. The device of claim 1, where the one or more processors, when providing the IP address to the user device, are to:
provide the IP address to the user device to cause the user device to provide a packet associated with the traffic flow of the data session to the other server,
the other server to analyze the packet to identify the IP address,
the other server to use the IP address to search the data structure to determine that the IP address is associated with a service identifier of the one or more service identifiers of the data service, and
the other server to charge the account associated with the sponsor based on determining that the IP address is associated with the service identifier of the data service.

8. A non-transitory computer-readable medium storing instructions, the instructions comprising:
one or more instructions that, when executed by one or more processors, cause the one or more processors to:
receive, from a user device, a request associated with an application that provides a data service,
where the request includes one or more service identifiers, and
where an application management program hosted on the user device is configured to obtain the one or more service identifiers from a plugin associated with the application;
determine whether the user device is eligible to use the data service toll-free by providing, to a server, a validation request that includes the one or more service identifiers;
receive a response from the server that is based on a validation procedure that indicates that the user device is eligible to use the data service toll-free;
obtain an internet protocol (IP) address that is reserved for toll-free usage by the application by using a service identifier of the one or more service identifiers to search a data structure associated with the data service; and
provide the IP address to the user device,
the user device to use the IP address for a data session of the application,
where traffic flow associated with the user device is received by another server that uses the IP address to charge, for the data session, an account associated with a sponsor of toll-free usage of the data service,
where using the IP address to charge for the data service comprises verifying that the IP address matches an IP address included in a set of IP addresses reserved for toll-free usage of the data service,
where the user device uses one or more other IP addresses, different from the IP address, for data usage not associated with the application, and
where, when the data session ends, the IP address is made available for assignment to another user device that is eligible to use the data service toll-free.

9. The non-transitory computer-readable medium of claim 8, where the user device uses the data service toll-free without the use of a proxy server.

10. The non-transitory computer-readable medium of claim 8,
where one or more processors of the user device cause the plugin associated with the application that provides the data service to automatically provide the one or more service identifiers to the application management program when the application is launched, and
where the one or more processors of the user device cause the application management program to provide the request associated with the data service to the one or more processors.

11. The non-transitory computer-readable medium of claim 8, where the one or more instructions, that cause the one or more processors to determine whether the user device is eligible to use the data service toll-free, cause the one or more processors to:
provide the validation request to the server to cause the server to use the one or more service identifiers to execute the validation procedure,
where the one or more service identifiers include a service identifier and an encrypted service identifier,
where the validation procedure includes using decryption logic to decrypt the encrypted service identifier, and
where the decrypted service identifier and the service identifier are compared to determine that the user device is eligible to use the data service toll-free.

12. The non-transitory computer-readable medium of claim 8, where the one or more instructions, that cause the one or more processors to determine whether the user device is eligible to use the data service toll-free, cause the one or more processors to:
determine a geographic location of the user device,
compare the geographic location of the user device to a geographic area associated with a toll-free data condition,
the toll-free data condition indicating that toll-free data is accessible within the geographic area, and
determine that the user device is eligible to use the data service toll-free based on comparing the geographic location of the user device to the geographic area associated with the toll-free data condition.

13. The non-transitory computer-readable medium of claim 8, where the one or more instructions, that cause the one or more processors to provide the IP address to the user device, cause the one or more processors to:
provide the IP address to the user device to cause the user device to provide a packet associated with the traffic flow of the data session to the other server,
the other server to analyze the packet to identify the IP address,
the other server to use the IP address to search the data structure to determine that the IP address is associated with a service identifier of the one or more service identifiers of the data service, and
the other server to charge the account associated with the sponsor based on determining that the IP address is associated with the service identifier of the data service.

14. A method, comprising:
receiving, by a device and from a user device, a request associated with an application that provides a data service,
where the request includes one or more service identifiers, and
where an application management program hosted on the user device is configured to use an application programming interface to interact with the application to obtain the one or more service identifiers;
determining, by the device, whether the user device is eligible to use the data service toll-free by providing, to a server, a validation request that includes the one or more service identifiers;
receiving, by the device, a response from the server that is based on a validation procedure that indicates that the user device is eligible to use the data service toll-free;
obtaining, by the device, an internet protocol (IP) address that is reserved for toll-free usage by the application by using a service identifier of the one or more service identifiers to search a data structure associated with the data service; and
providing, by the device, the IP address to the user device,
the user device to use the IP address for a data session of the application,
where traffic flow associated with the user device is received by another server that uses the IP address to charge, for the data session, an account associated with a sponsor of toll-free usage of the data service, where using the IP address to charge for the data service comprises verifying that the IP address matches an IP address included in a set of IP addresses reserved for toll-free usage of the data service, where the user device uses one or more other IP addresses, different from the IP address, for data usage not associated with the application, and where, when the data session ends, the IP address is made available for assignment to another user device that is eligible to use the data service toll-free.

15. The method of claim 14, where the user device uses the data service toll-free without the use of a proxy server.

16. The method of claim 14, where one or more processors of the user device cause the application management program to provide the request associated with the data service to the device.

17. The method of claim 14, where determining whether the user device is eligible to use the data service toll-free comprises:

providing the validation request to the server to cause the server to use the one or more service identifiers to execute a validation procedure, the validation procedure to determine whether the user device is eligible to use the data service toll-free.

18. The method of claim 14, where determining whether the user device is eligible to use the data service toll-free comprises:

obtaining user profile information for a user associated with the user device, comparing the user profile information to a toll-free data condition that allows toll-free data if the user profile information includes particular characteristics, and determining that the user device is eligible to use the data service toll-free based on comparing the user profile information to the toll-free data condition.

19. The method of claim 14, where determining whether the user device is eligible to use the data service toll-free comprises:

determining that the user device provided consent to receive advertisements, and determining that the user device is eligible to use the data service toll-free based on determining that the user device provided consent to receive advertisements.

20. The method of claim 14, where obtaining the IP address that is reserved for the data service comprises:

providing a request for the IP address to a data source, the request for the IP address causing the data source to select the IP address from the data structure, the IP address being one of a set of IP addresses reserved for the data service, and receiving the IP address from the data source.

* * * * *